US006247543B1

(12) United States Patent
Patel et al.

(10) Patent No.: US 6,247,543 B1
(45) Date of Patent: Jun. 19, 2001

(54) SHALE HYDRATION INHIBITION AGENT AND METHOD OF USE

(75) Inventors: Arvind D. Patel; Emanuel Stamatakis; Eric Davis, all of Houston, TX (US)

(73) Assignee: M-I LLC, Houston, TX (US)

( * ) Notice: Subject to any disclaimer, the term of this patent is extended or adjusted under 35 U.S.C. 154(b) by 0 days.

(21) Appl. No.: 09/503,558

(22) Filed: Feb. 11, 2000

(51) Int. Cl.[7] .............................. C09K 7/02; E21B 21/00
(52) U.S. Cl. ................................ 175/64; 175/65; 175/72; 507/113; 507/117; 507/133; 507/140; 507/145; 507/905
(58) Field of Search ......................... 175/64, 65, 72; 507/113, 117, 119, 120, 133, 140, 145, 246, 905, 925

(56) References Cited

U.S. PATENT DOCUMENTS

| | | | |
|---|---|---|---|
| 2,960,464 | * 11/1960 | Weiss et al. | 176/64 |
| 3,123,559 | * 3/1964 | Fischer | 507/133 |
| 3,385,789 | * 5/1968 | King | 507/140 |
| 3,404,165 | * 10/1968 | Budde, Jr. et al. | 507/133 X |
| 3,726,796 | 4/1973 | Schweiger . | |
| 3,928,695 | 12/1975 | Philp et al. . | |
| 4,148,736 | 4/1979 | Meister . | |
| 4,220,585 | 9/1980 | Javora et al. . | |
| 4,366,071 | 12/1982 | McLaughlin et al. . | |
| 4,366,072 | 12/1982 | McLaughlin et al. . | |
| 4,366,074 | 12/1982 | McLaughlin et al. . | |
| 4,374,739 | 2/1983 | McLaughlin et al. . | |
| 4,383,933 | 5/1983 | Jenkins . | |
| 4,435,564 | * 3/1984 | House | 507/925 X |
| 4,440,649 | 4/1984 | Loftin et al. . | |
| 4,519,922 | * 5/1985 | Sutton et al. | 507/905 X |
| 4,526,693 | 7/1985 | Son et al. . | |
| 4,536,297 | 8/1985 | Loftin et al. . | |

(List continued on next page.)

FOREIGN PATENT DOCUMENTS

| | | |
|---|---|---|
| 876019 | 7/1971 | (CA) . |
| 1185779 | 4/1985 | (CA) . |
| 2088344 | 6/1987 | (CA) . |
| 3238394 | 4/1984 | (DE) . |
| 272287A1 | 10/1989 | (DE) . |
| 0125957 | 4/1984 | (EP) . |
| 0136773 | 6/1984 | (EP) . |
| 0 136 773 | 4/1985 | (EP) . |
| 0182669 | 5/1986 | (EP) . |
| 0241340 | 3/1987 | (EP) . |
| 0 241 340 | 10/1987 | (EP) . |
| 0330379 | 8/1989 | (EP) . |
| 2164370 | 3/1986 | (GB) . |
| 2175291A | 11/1986 | (GB) . |
| 486128 | 1/1976 | (RU) . |
| 1320220 | 6/1987 | (RU) . |
| 88/07499 | 10/1988 | (WO) . |
| 90/07337 | 7/1990 | (WO) . |

OTHER PUBLICATIONS

J.P. Tatum, "Organophilic Clays for Low–Toxicity Drilling Fluids," *3rd Royal Chemicals in the Oil Industry Symposium*, pp. 31–36, Manchester England, 1988.
J.P. Tatum, "Organophilic Clays," *Royal Industrial Applications of Surfactants Symposium*, pp. 289–306. Salford, England, 1987.
J.K. Borcharrdt, "Organic Polymer Formation Damage Control Chemicals A Review of Basic Chemistry and Field Results", *Symposium on Advances in Oil Field Chemistry* Presented Before the Division of Petroleum Chemistry Inc. American Chemical Society. Toronto, Canada, Jun. 1988.
B. Bajdjuk, et al., "New Methods for Determining Physico–Mechanical Properties of Rocks, in Order to Choose Drilling Fluids", *Nafta*, vol. 44, No. 10, pp. 261–264, Russia, Oct., 1988.
M.I. Lipkes, et al., "Effect of the Addition of Quarternary Ammonium Compounds on the Properties of Water Base Clay Drilling Muds", *Neft Khoz*, No. 6, pp. 33–35, Russia, Jun., 1990.
T.W. Beihoffer, et al., "The Development of an Inhibitive Cationic Drilling Fluid for Slim–Hole Coring Applications", *Society of Petroleum Engineers Drilling Conference* Proceedings, Houston, Texas, Feb. 27 –Mar. 2, 1990, pp. 341–351.
R.H. Retz, et al., "An Environmentally Acceptable and Field–Practical, Cationic Polymer Mud System", *Society of Petroleum Engineers Offshore Europe Conference*, Aberdeen, Sep. 1991, pp. 325–336.
Kirk–Othmer, "Encyclopedia of Chemical Technology", Third Edition, vol. 1, A to Alkanolamines, pp. 944–960, 1978.
Product Information entitled JEFFAMINE® Polyoxyalkylene Amines, Nov. 19, 1999.
Product Information entitled Diamine Products, Nov. 19, 1999.
Technical Bulletin of Huntsman entitled JEFFAMINE® D–230 Polyoxypropylenediamine (undated).

*Primary Examiner*—George Suchfield
(74) *Attorney, Agent, or Firm*—Howrey Simon Arnold & White; Carter J. White; Stephen H. Cagle

(57) ABSTRACT

A water-base drilling fluid for use in drilling wells through a formation containing a shale which swells in the presence of water. The drilling fluid preferably includes: an aqueous based continuous phase, a weight material, and a shale hydration inhibition agent having the formula:

$$H_2N-CH(CH_3)CH_2\{-OCH_2CH(CH_3)-\}_x-NH_2$$

in which x is a value less than 15. The shale hydration inhibition agent should be present in sufficient concentration to reduce the swelling of the shale. Preferably x has an average number between about 1 and about 5 and more preferably x has an average number of about 2.6. Also inclusive of the present invention is a method of reducing the swelling of shale clay encountered during the drilling of a subterranean well, the method comprising circulating in the well a water-base drilling fluid formulated in accordance with the present invention.

19 Claims, 3 Drawing Sheets

U.S. PATENT DOCUMENTS

| | | |
|---|---|---|
| 4,605,772 | 8/1986 | Darby et al. . |
| 4,637,883 | 1/1987 | Patel et al. . |
| 4,645,608 | 2/1987 | Rayborn . |
| 4,666,613 * | 5/1987 | Schapira et al. ................. 507/133 X |
| 4,710,586 | 12/1987 | Patel et al. . |
| 4,713,183 | 12/1987 | Patel et al. . |
| 4,767,549 | 8/1988 | McEwen et al. . |
| 4,820,511 | 4/1989 | Hoffkee et al. . |
| 4,828,724 | 5/1989 | Davidson . |
| 4,828,726 | 5/1989 | Hines et al. . |
| 4,842,073 | 6/1989 | Himes et al. ........................ 166/194 |
| 4,847,342 | 7/1989 | Peiffer ................................. 526/229 |
| 4,889,645 | 12/1989 | Firth et al. . |
| 4,913,585 | 4/1990 | Thompson et al. ................. 405/128 |
| 4,940,764 | 7/1990 | Meister ............................... 527/400 |
| 4,990,270 | 2/1991 | Meister . |
| 5,026,490 | 6/1991 | Peiffer et al. . |
| 5,066,753 | 11/1991 | Peiffer ................................. 526/310 |
| 5,089,151 | 2/1992 | Hall et al. . |
| 5,097,904 | 3/1992 | Himes ................................. 166/294 |
| 5,099,923 | 3/1992 | Aften et al. ......................... 166/294 |
| 5,149,690 | 9/1992 | Patel et al. .......................... 507/131 |
| 5,211,250 * | 5/1993 | Kubena, Jr. et al. ................. 175/72 |
| 5,260,268 * | 11/1993 | Forsberg et al. .................... 507/133 |
| 5,350,740 | 9/1994 | Patel et al. .......................... 507/129 |
| 5,380,706 | 1/1995 | Himes et al. ........................ 507/129 |
| 5,424,284 | 6/1995 | Patel et al. .......................... 507/129 |
| 5,558,171 * | 9/1996 | McGlothlin et al. .................. 175/64 |
| 5,593,952 * | 1/1997 | Jarrett .............................. 507/133 X |
| 5,741,758 * | 4/1998 | Pakulski ............................ 507/246 X |
| 5,771,971 | 6/1998 | Horton et al. ....................... 166/283 |
| 5,908,814 | 6/1999 | Patel et al. .......................... 507/131 |
| 6,054,416 * | 4/2000 | Bland ................................ 507/905 X |
| 6,103,671 * | 8/2000 | Dobson et al. .................. 507/140 X |

* cited by examiner

SHALE HYDRATION INHIBITION AGENT AND METHOD OF USE

BACKGROUND OF THE INVENTION

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and acts to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers which results in an increased c-spacing. All types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts generally reduce the swelling of clays. However, salts flocculate the clays resulting in both high fluid losses and an almost complete loss of thixotropy. Further, increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling.

Organic shale inhibitor molecules can be either cationic, anionic, or nonionic. Cationic organic shale inhibitors dissociate into organic cations and inorganic anions, while anionic organic shale inhibitors dissociate into inorganic cations and organic anions. Nonionic organic shale inhibitor molecules do not dissociate.

It is important that the driller of subterranean wells be able to control the rheological properties of drilling fluids by using additives, including organic shale inhibitor molecules. In the oil and gas industry today it is desirable that additives work both onshore and offshore and in fresh and salt water environments. In addition, as drilling operations impact on plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control the swelling of the clay and drilled formations without adversely effecting the Theological properties of drilling fluids. The present invention addresses this need.

SUMMARY OF THE INVENTION

The present invention is generally directed to a water-base drilling fluid for use in drilling wells through a formation containing a shale which swells in the presence of water. In one embodiment, the drilling fluid includes: a weight material and a shale hydration inhibition agent having the general formula:

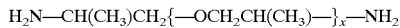

$$H_2N\text{—}CH(CH_3)CH_2\{\text{—}OCH_2CH(CH_3)\text{—}\}_x\text{—}NH_2$$

in which x is a value less than 15, and the shale hydration inhibition agent is present in sufficient concentration to reduce the swelling of the shale. The hydration inhibiting agent should have an average number for the x of between about 1 and about 5 preferably between 1 and 3 and more preferably x should have an average number of about 2.6. Alternatively, the value of x should be selected such that the average molecular weight of the hydration inhibition agent is from about 132 to about 944 and preferably is from about 190 to about 248.

Further the shale hydration inhibition agent should preferably be further characterized by a relatively low toxicity as measured by the Mysid shrimp test and compatibility with drilling fluid components that may be present in the drilling fluid. The United States Environmental Protection Agency has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis)" 1984 EPA-600/3-84-067, the subject matter of which is incorporated herein by reference.

For purposes of understanding the term "low toxicity" within the context of this application, the term refers to a drilling fluid with an LC50 of greater than 30,000 ppm by the Mysid shrimp test. Although 30,000 has been the number used for purposes of evaluation it should not be considered a limitation on the scope of this invention. Rather, the tests provide a context for use of the term "low toxicity" as used in the present invention which will be readily understood by those with ordinary skill in the art. Other LC50 values may be viable in various environmental settings. An LC50 value of greater than 30,000 has been equated to an "environmentally compatible" product. The product I of this invention was tested for its LC50 toxicity value. LC50 for this product was 668,100 ppm at the 10 pound per barrel concentration in generic mud #7. This indicates the product of this invention is less toxic to the marine environment.

The drilling fluids of the present invention preferably have an aqueous based continuous phase selected from: fresh water, sea water, brine, mixtures of water and water soluble organic compounds and mixtures thereof. In addition such a drilling fluid may further contain a fluid loss control agent selected from the group of organic synthetic polymers, biopolymers and sized particle diatomaceous earth, and mixtures thereof.

It is in the scope of the present invention that the drilling fluid may further contain an encapsulating agent such as one preferably selected from the group consisting of organic and inorganic polymers and mixtures thereof. A weight material may also be included in the formulation of the drilling fluid with the weighting agent preferably being selected from the group of barite, hematite, iron oxide, calcium carbonate, magnesium carbonate, soluble and insoluble organic and inorganic salts, and combinations thereof.

Also inclusive of the present invention is a method of reducing the swelling of shale clay in a well comprising circulating in the well a water-base drilling fluid formulated in accordance with the present invention.

These and other features of the present invention are more fully set forth in the following description of illustrative embodiments of the invention.

BRIEF DESCRIPTION OF THE DRAWINGS

The description is presented with reference to the accompanying drawings in which.

DESCRIPTION OF ILLUSTRATIVE EMBODIMENTS

Figure 1:
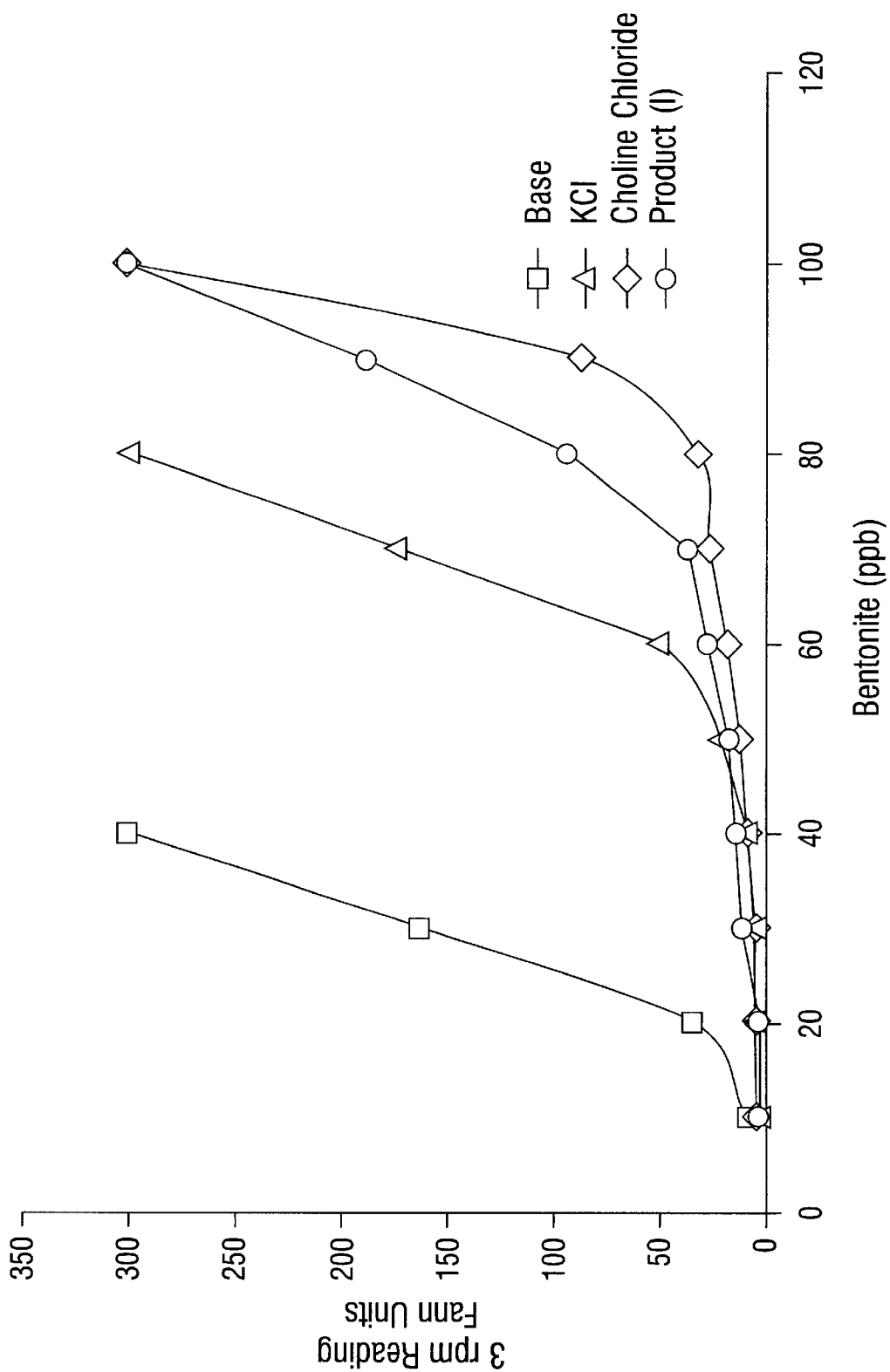
FIG. 1 is a graphical representation of the data presented in Example 4, Table 15.

The present invention is directed to a water-base drilling fluid for use in drilling wells through a formation containing a shale which swells in the presence of water. Generally the drilling fluid of the present invention includes a weight material, a shale hydration inhibition agent and an aqueous continuous phase. As disclosed below, the drilling fluids of the present invention may also include additional components, such as fluid loss control agents, bridging agents, lubricants, anti-bit balling agents, corrosion inhibition agents, surfactants and suspending agents and the like which may be added to an aqueous based drilling fluid.

The shale hydration inhibition agent of the present invention is preferably a polyoxyalkyleneamine which inhibits the swelling of shale that may be encountered during the drilling process. Preferably the alkylene group is a propylene, thus the shale inhibition agents of the present invention may be selected from the general group of polyoxypropyleneamines. While a variety of members of this group may serve as shale inhibition agents, we have found that compounds having the general formula

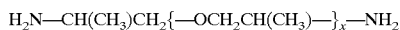

provide effective inhibition of shale hydration.

The value of x has been found to be a factor in the ability of the shale hydration inhibitors to carry out their desired role. The value of x may be a whole number or fractional number that reflects the average molecular weight of the compound. In one embodiment of the present invention x may have a value less than 15 and preferably have a value between about 1 and about 5. In one particularly preferred embodiment, the value of x has an average number of about 2.6.

Alternatively and in another embodiment of the present invention, the value of x is determined by the molecular weight of the shale hydration inhibition agent. Thus x is selected such that the average molecular weight of the hydration inhibition agent is from about 132 to about 944 and preferably x is selected such that the average molecular weight of the hydration inhibition agent is from about 190 to about 248. However, regardless of how a particular value of x is selected, the key criteria are that the shale hydration inhibition agent should function as intended in the drilling fluid and should minimize any impact it might have on the other properties of the drilling fluid.

The shale hydration inhibition agent should be present in sufficient concentration to reduce either or both the surface hydration based swelling and/or the osmotic based swelling of the shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

In addition to the inhibition of shale hydration by the shale hydration inhibition agent, other properties are beneficially achieved. In particular it has been found that the shale hydration inhibition agents of the present invention may also be further characterized by their compatibility with other drilling fluid components, tolerant to contaminants, temperature stability and low toxicity. These factors contribute to the concept that the shale hydration inhibition agents of the present invention may have broad application both in land based drilling operations as well as offshore drilling operations.

The drilling fluids of the present invention include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled.

Weight materials suitable for use in the formulation of the drilling fluids of the present invention may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as Theologically and functionally required by drilling conditions. Typical gelling materials used in aqueous based drilling fluids are bentonite, sepiolite clay, attapulgite clay, anionic high-molecular weight polymer and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the present invention that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is prefered that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates,xanthan gum, mixtures of these and the like.

The drilling fluid of the present invention may further contain an encapsulating agent generally selected from the group consisting of synthetic organic, inorganic and biopolymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anioic, cationic or non-ionic in nature.

Other additives that could be present in the drilling fluids of the present invention include products such as lubricants, penetration rate enhancers, defoamers, corrosion inhibitors and loss circulation products. Such compounds should be known to one of ordinary skill in the art of formulating aqueous based drilling fluids.

The use of the above disclosed drilling fluids is contemplated as being within the scope of the present invention. Such use would be conventional to the art of drilling subterranean wells and one having skill in the art should appreciate such processes and applications.

Thus one embodiment of the present invention may include a method of reducing the swelling of shale clay in a well, involving circulating in the well a water-base drilling fluid formulated in accordance with the present disclosure. Preferably such a fluid would include: an aqueous based continuous phase, a weight material and a shale hydration inhibition agent having the formula:

$$H_2N—CH(CH_3)CH_2\{—OCH_2CH(CH_3)—\}_x—NH_2$$

As noted above, x should have a value less than 15, and preferably between about 1 and about 5 and more preferably x should have an average number of about 2.6. Further the drilling fluid should include the shale hydration inhibition agent present in sufficient concentration to reduce the swelling of the clay encountered in the well drilling process.

Another embodiment of the present inventive method includes a method of reducing the swelling of shale in a well comprising circulation in the well, a water-base fluid formulated in accordance with the teachings of this disclosure.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$)which is another variable used in the calculation of viscosity characteristics of drilling fluids.

"GELS" (lbs/100 ft$^2$)is a measure of the suspending characteristics and the thixotropic properties of a drilling fluid.

"F/L" is API fluid loss and is a measure of fluid loss in milliliters of drilling fluid at 100 psi.

For purposes of the following examples the following shale hydration inhibition agent additive codes are utilized:

| Additive Code | Chemical |
|---|---|
| A | Jeffamine T-403    x + y + z = 5.3 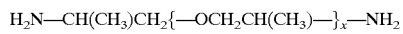 |
| B | N-Aminopropylmorpholine |
| C | Jeffamine BUD-2000    x = 33 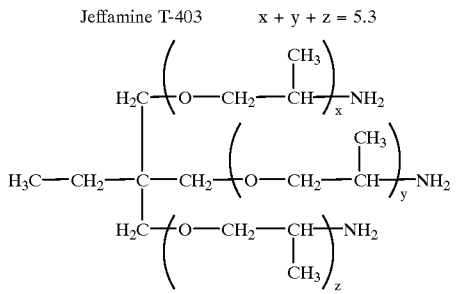 |
| D | Jeffamine D-2000    x = 33.1 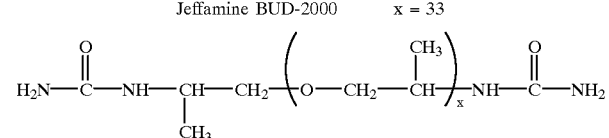 |
| E | Jeffamine T-3000    x + y + z = 50 |

-continued

| Additive Code | Chemical |
|---|---|
| G | Jeffamine T-5000, x + y + z = 83 (triol-based tris(polyoxypropylene) triamine structure) |
| H | Jeffamine DU-700, x + y = 9.1 (urea-linked bis(polyoxypropylene)diamine structure) |
| I | Jeffamine D-230, x = 2.6 ($H_2N-CH(CH_3)-CH_2-(O-CH_2-CH(CH_3))_x-NH_2$) |
| J | Jeffamine D-4000, x = ~68 ($H_2N-CH(CH_3)-CH_2-(O-CH_2-CH(CH_3))_x-NH_2$) |
| K | Jeffamine D-400, x = 5.6 ($H_2N-CH(CH_3)-CH_2-(O-CH_2-CH(CH_3))_x-NH_2$) |
| L | Jeffamine M-600, x = 8 ($H_3C-O-CH_2-CH_2-O-(CH(CH_3)-CH_2-O)_x-CH_2-CH(CH_3)-NH_2$) |

EXAMPLE 1

In the present example, a variety of polyoxypropyleneamines were tested to determine if they all would function as shale inhibitors or if only certain chemical structures and molecular weight ranges were acceptable.

We have found that only certain structures and molecular weight ranges worked well for shale inhibition. In this procedure we used pint jars that are filled with one barrel equivalent of tap water and test sample, adjusted the value of pH to at least a pH of 9 and treated with a 50 ppb portion M-I GEL (bentonite) at a medium shear rate. After stiring for 30 minutes, the rheologies were measured and then the samples were heat aged overnight at 150° F. After the samples were cooled their rheologies and pHs were recorded. The following data is representative of how the rheologies are affected by the addition of the 50 ppb of bentonite in tap water treated with the experimental inhibitors.

TABLE 1

Bentonite Hydration Study
Initial Rheology

| Additive | RPM | | | | | |
|---|---|---|---|---|---|---|
| | 600 | 300 | 200 | 100 | 6 | 3 |
| A | 92 | 67 | 57 | 51 | 43 | 43 |
| B | 206 | 170 | 162 | 160 | 112 | 70 |
| C | 174 | 115 | 95 | 70 | 38 | 38 |
| D | 133 | 81 | 63 | 41 | 18 | 18 |
| E | 146 | 90 | 68 | 43 | 19 | 18 |
| G | 300* | — | — | — | — | — |
| H | 111 | 71 | 59 | 46 | 33 | 33 |
| I | 28 | 19 | 16 | 12 | 9 | 9 |
| J | 300* | — | — | — | — | — |
| K | 40 | 25 | 19 | 13 | 7 | 7 |
| L | 52 | 33 | 25 | 17 | 5 | 4 |

*If 600 RPM reading is greater than 300, no further readings were taken.

TABLE 2

Bentonite Hydration Study
Initial Rheology

| Additive | Gels 10 sec. | Gels 10 min. | PV | YP | pH |
|---|---|---|---|---|---|
| A | 45 | 40 | 25 | 42 | 12.0 |
| B | 61 | 65 | 36 | 134 | 12.0 |
| C | 61 | 90 | 59 | 56 | 9.0 |
| D | 56 | 94 | 52 | 29 | 11.1 |
| E | 58 | 103 | 56 | 34 | 11.1 |
| G | 275 | 270 | — | — | 10.0 |
| H | 63 | 130 | 40 | 31 | 11.7 |
| I | 11 | 14 | 9 | 10 | 12.1 |
| J | 232 | 231 | — | — | 10.0 |
| K | 17 | 30 | 15 | 10 | 11.5 |
| L | 11 | 25 | 19 | 14 | 11.1 |

TABLE 3

Bentonite Hydration Study
Heat Aged Rheology (150° F.)

| Additive | RPM | | | | | |
|---|---|---|---|---|---|---|
| | 600 | 300 | 200 | 100 | 6 | 3 |
| A | 145 | 121 | 111 | 96 | 32 | 23 |
| B | 132 | 104 | 94 | 75 | 36 | 23 |
| C | 300* | — | — | — | — | — |
| D | 300* | — | — | — | — | — |
| E | 300* | — | — | — | — | — |
| G | 300* | — | — | — | — | — |
| H | 300* | — | — | — | — | — |
| I | 24 | 14 | 10 | 6 | 1 | 1 |
| J | 300* | — | — | — | — | — |
| K | 37 | 21 | 15 | 8 | 1 | 1 |
| L | 40 | 24 | 17 | 10 | 1 | 1 |

*If 600 RPM reading is greater than 300, no further readings were taken.

TABLE 4

Bentonite Hydration Study
Heat Aged Rheology (150° F.)

| Additive | Gels 10 sec. | Gels 10 min. | PV | YP | pH |
|---|---|---|---|---|---|
| A | 23 | 19 | 24 | 97 | 11.5 |
| B | 22 | 23 | 28 | 76 | 11.6 |
| C | — | — | — | — | — |
| D | — | — | — | — | — |
| E | — | — | — | — | — |
| G | — | — | — | — | — |
| H | — | — | — | — | — |
| I | 1 | 2 | 10 | 4 | 11.5 |
| J | — | — | — | — | — |
| K | 1 | 1 | 16 | 5 | 11.5 |
| L | 1 | 1 | 16 | 8 | 11.1 |

The above results should show to one of skill in the art that samples (A), (I), (K) and (L) of this invention performed well as shale hydration inhibitors.

EXAMPLE 2

The data in example 1 should show to one of skill in the art that when "x" is greater than 2.6 as in the sample (K) (Jeffamine D-400 [x=5.6]), sample (D) (Jeffamine D-2000 [x=33.1]), and sample (J) (Jeffamine D-4000 [x=66]), the performance of the materials decrease with increasing molecular weight with respect to inhibition. This can be seen more clearly from the data shown in Tables 5 thru 8.

TABLE 5

50 lbs M-I GEL
Initial Rheology

| Additive | RPM | | | | | |
|---|---|---|---|---|---|---|
| | 600 | 300 | 200 | 100 | 6 | 3 |
| (I) (x = 2.6) | 28 | 19 | 16 | 12 | 9 | 9 |
| (K) (x = 5.6) | 40 | 25 | 19 | 13 | 7 | 7 |
| (D) (x = 33.1) | 133 | 81 | 63 | 41 | 18 | 18 |
| (J) (x = 66.0) | 300* | — | — | — | — | — |

*If 600 RPM reading is greater than 300, no further readings were taken.

TABLE 6

Bentonite Hydration Study
50 lbs M-I GEL
Initial Rheology

| Additive | Gels 10 sec. | Gels 10 min. | PV | YP |
|---|---|---|---|---|
| (I) (x = 2.6) | 11 | 14 | 9 | 10 |
| (K) (x = 5.6) | 17 | 30 | 15 | 10 |
| b(D) (x = 33.1) | 56 | 94 | 52 | 29 |
| (J) (x = 66.0) | — | — | — | — |

TABLE 7

50 lbs M-I GEL
Heat Aged Rheology (150° F.)

| Additive | RPM | | | | | |
|---|---|---|---|---|---|---|
| | 600 | 300 | 200 | 100 | 6 | 3 |
| (I) (x = 2.6) | 24 | 14 | 10 | 6 | 1 | 1 |
| (K) (x = 5.6) | 37 | 21 | 15 | 8 | 1 | 1 |
| (D) (x = 33.1) | 300* | — | — | — | — | — |
| (J) (x = 66.0) | 300* | — | — | — | — | — |

*If 600 RPM reading is greater than 300, no further readings were taken.

TABLE 8

Bentonite Hydration Study
50 lbs M-I GEL
Heat Aged Rheology (150°)

| Additive | Gels 10 sec. | Gels 10 min. | PV | YP |
|---|---|---|---|---|
| (I) (x = 2.6) | 1 | 2 | 10 | 4 |
| (K) (x = 5.6) | 1 | 1 | 16 | 5 |
| (D) (x = 33.1) | — | — | — | — |
| (J) (x = 66.0) | — | — | — | — |

EXAMPLE 3

The following test was conducted to demonstrate the maximum amount of API bentonite that can be inhibited by a single 8 pounds per barrel (ppb) treatment of shale inhibitor of the present invention over a period of days. This test procedure uses pint jars that are filled with one barrel equivalent of tap water and 8 ppb of a shale inhibitor. Tap water was used as a control sample. All samples were adjusted to at least a pH of 9 and treated with a 10 ppb portion of M-I GEL (bentonite) at a medium shear rate. After stirring for 30 minutes, the rheologies were measured and then the samples were heat aged overnight at 150° F. After the samples were cooled their rheologies and pHs were recorded. All samples were then adjusted to pH 9 before treating them again with bentonite as previously described. This procedure was carried out for each sample until all were too thick to measure. Tables 9 thru 14 present representative data that shows shale inhibition effects of the present invention by the daily addition of bentonite in tap water treated with the inhibitors indicated at the top of each column.

TABLE 9

600 rpm Rheologies - Heat Aged (150° F.)

| Bentonite (lb/bbl) | Base | (A) | (I) | (K) | (L) |
|---|---|---|---|---|---|
| 30 | 162 | 15 | 9 | 13 | 18 |
| 40 | 300* | 35 | 11 | 28 | 35 |
| 50 | — | 55 | 15 | 56 | 74 |
| 60 | — | 83 | 22 | 107 | 146 |
| 70 | — | 172 | 43 | 172 | 259 |

TABLE 9-continued 600 rpm Rheologies - Heat Aged (150° F.)

| Bentonite (lb/bbl) | Base | (A) | (I) | (K) | (L) |
|---|---|---|---|---|---|
| 80 | — | — | 94 | — | — |
| 90 | — | — | 189 | — | — |

*If 600 RPM reading is greater than 300, no further readings were taken.

TABLE 10

300 rpm Rheologies - Heat Aged (150° F.)

| Bentonite (lb/bbl) | Base | (A) | (I) | (K) | (L) |
|---|---|---|---|---|---|
| 30 | 112 | 8 | 5 | 7 | 9 |
| 40 | — | 21 | 6 | 16 | 18 |
| 50 | — | 31 | 8 | 31 | 41 |
| 60 | — | 42 | 11 | 56 | 71 |
| 70 | — | 82 | 22 | 82 | 121 |
| 80 | — | — | 47 | — | — |
| 90 | — | — | 95 | — | — |

TABLE 11

3 rpm Rheologies - Heat Aged (150°)

| Bentonite (lb/bbl) | Base | (A) | (I) | (K) | (L) |
|---|---|---|---|---|---|
| 30 | 8 | 0 | 0 | 0 | 0 |
| 40 | 132 | 0 | 0 | 0 | 0 |
| 50 | — | 0 | 0 | 0 | 0 |
| 60 | — | 0 | 0 | 0 | 0 |
| 70 | — | 0 | 0 | 0 | 0 |
| 80 | — | — | 0 | — | — |
| 90 | — | — | 1 | — | — |

TABLE 12

10 Min Gels - Heat Aged (150°)

| Bentonite (lb/bbl) | Base | (A) | (I) | (K) | (L) |
|---|---|---|---|---|---|
| 30 | 30 | 1 | 0 | 0 | 0 |
| 40 | 184 | 2 | 0 | 0 | 0 |
| 50 | — | 2 | 0 | 0 | 0 |
| 60 | — | 3 | 0 | 0 | 0 |
| 70 | — | 3 | 0 | 0 | 3 |
| 80 | — | — | 0 | — | — |
| 90 | — | — | 0 | — | — |

TABLE 13

Plastic Viscosity - Heat Aged (150°)

| Bentonite (lb/bbl) | Base | (A) | (I) | (K) | (L) |
|---|---|---|---|---|---|
| 30 | 50 | 7 | 4 | 6 | 9 |
| 40 | — | 12 | 6 | 12 | 16 |
| 50 | — | 24 | 7 | 25 | 33 |
| 60 | — | 41 | 11 | 51 | 75 |
| 70 | — | 90 | 21 | 90 | 138 |
| 80 | — | — | 47 | — | — |
| 90 | — | — | 94 | — | — |

TABLE 14

Yield Point - Heat Aged (150°)

| Bentonite (lb/bbl) | Base | (A) | (I) | (K) | (L) |
|---|---|---|---|---|---|
| 30 | 62 | 1 | 1 | 1 | 1 |
| 40 | — | 7 | 1 | 4 | 1 |
| 50 | — | 7 | 1 | 6 | 8 |
| 60 | — | 1 | 0 | 5 | 4 |
| 70 | — | 8 | 1 | 8 | 17 |
| 80 | — | — | 1 | — | — |
| 90 | — | — | 0 | — | — |

Upon review of the above rheology data in tables 9–14, one of skill in the art should appreciate and see that the (I) product with "x" being approximately 2.6 gives the best performance. When "x" is greater than 2.6 as in the samples (K) (Jeffamine D-400 [x=5.6]), (D) (Jeffamine D-2000 [x=33.1]), and (J) (Jeffamine D-4000 [y=66]), the data shows that with increasing molecular weight the performance of the material decreases with respect to inhibition.

EXAMPLE 4

To demonstrate the superior performance of products of this invention, the performance was compared to potassium chloride and choline chloride. Our first study was designed to determine the maximum amount of API bentonite that can be inhibited by a single eight pound per barrel treatment of shale inhibitor (I) over a period of days.

Figure 2:
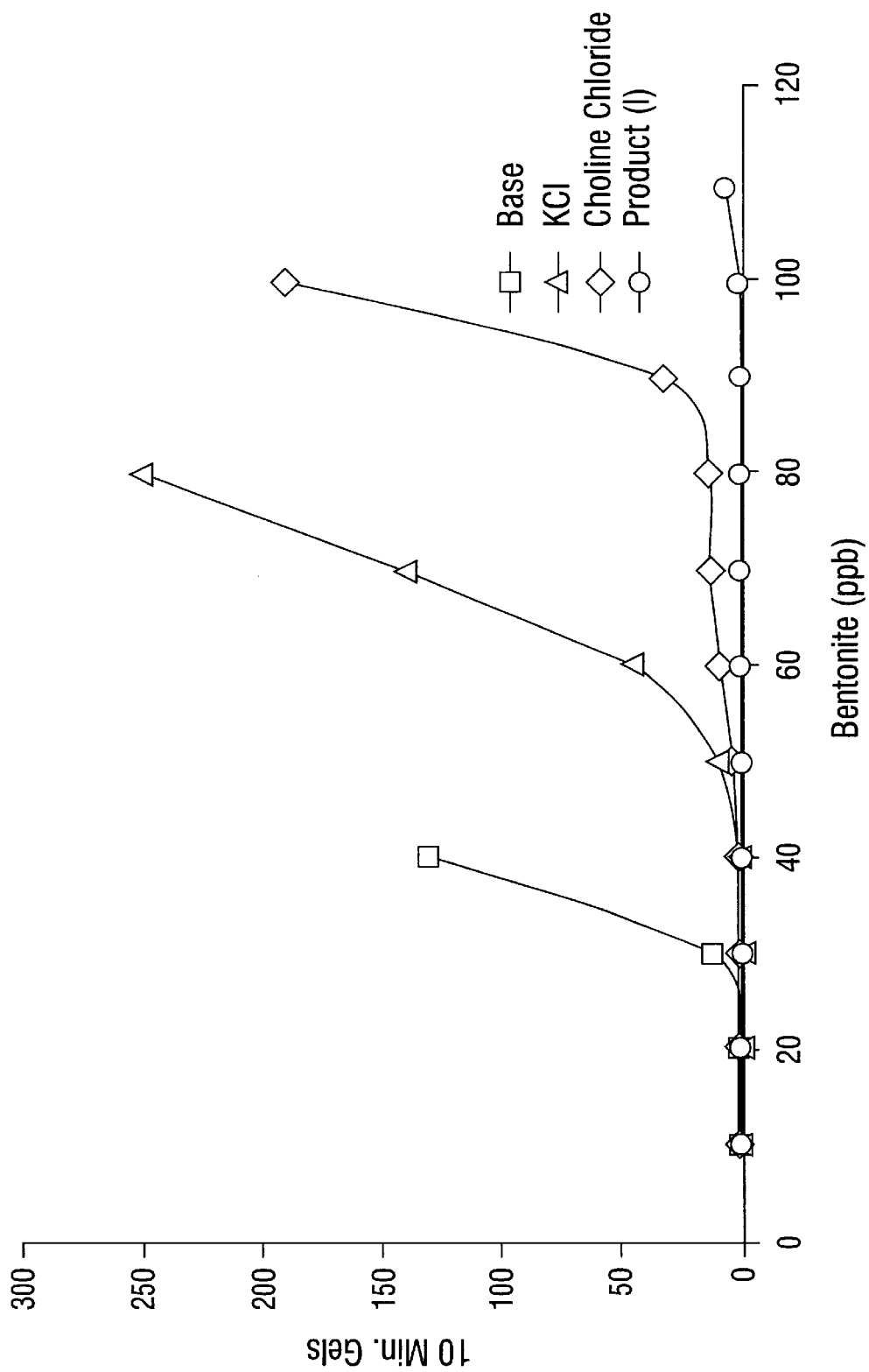
FIG. 2 is a graphical representation of the data presented in Example 4, Table 16.
Figure 3:
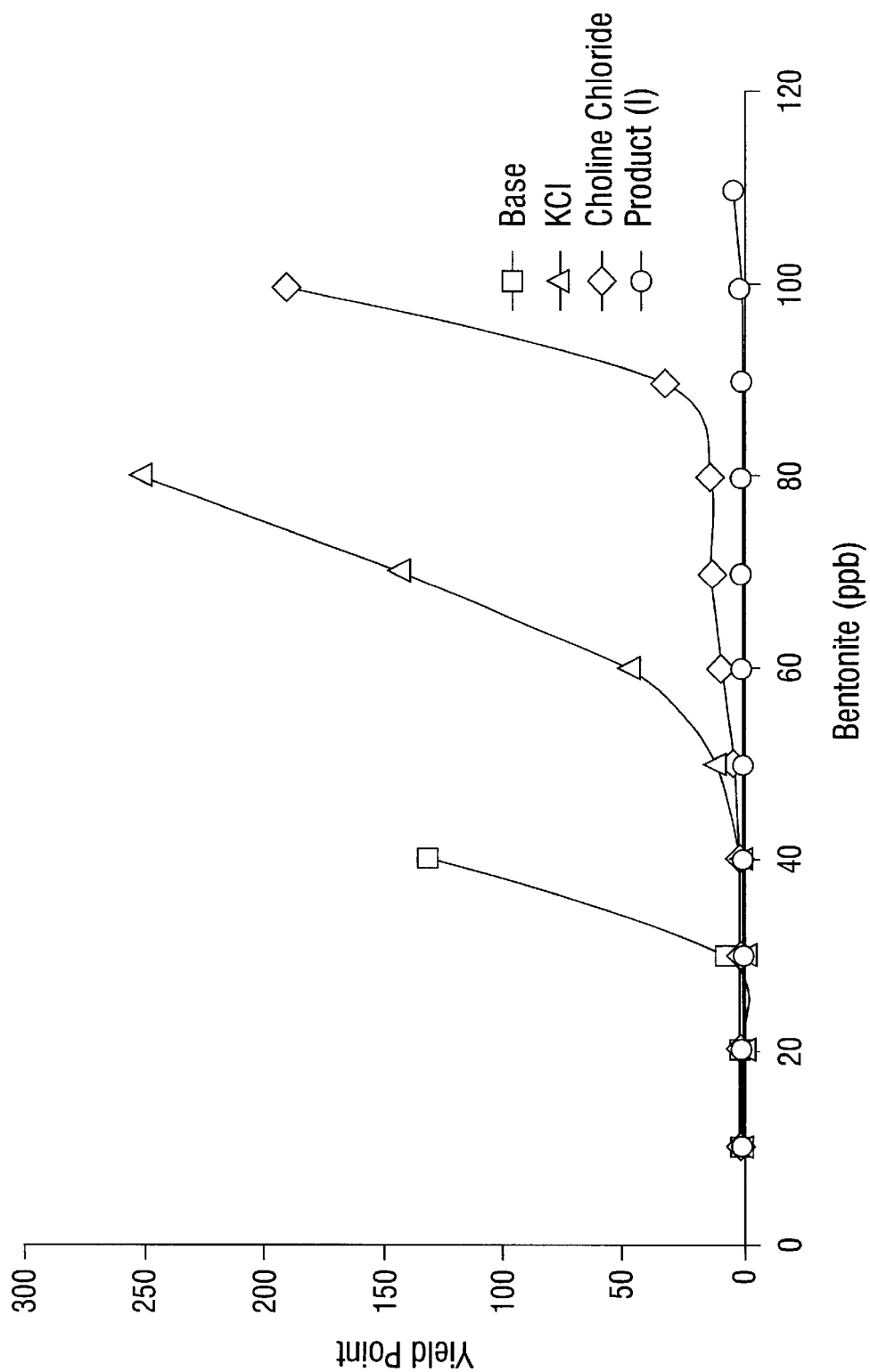
FIG. 3 is a graphical representation of the data presented in Example 4, Table 17.

This test uses one-barrel equivalent of tap water with 8 ppb of a shale inhibitor (I). (Tap water was used as control.) All samples were adjusted at least to pH of 9 and treated with a 10 ppb portion of M-I GEL (bentonite) at a medium rate of shear. After stirring for 30 minutes, the rheologies were measured and then the samples were aged overnight at 150° F. After the samples were cooled their rheologies and pHs were recorded. All samples were then adjusted to at least pH 9 before treating them again with bentonite as previously described. This procedure was carried out for each sample until all were too thick to measure. FIGS. 1–3 are a graphical representation of the data given in the tables 15 thru 17 below. The data show the superior performance of the products of the present invention when compared with other industry standards. The study included choline chloride and potassium chloride as industry standards.

TABLE 15

3 rpm Rheologies - Heat Aged (150° F.)

| Bentonite (lb/bbl) | Base | KCl | Choline Chloride | (I) |
|---|---|---|---|---|
| 10 | 1 | 2 | 1 | 0 |
| 20 | 1 | 0 | 1 | 0 |
| 30 | 8 | 0 | 1 | 0 |
| 40 | 132 | 2 | 1 | 0 |
| 50 | — | 12 | 3 | 1 |
| 60 | — | 48 | 8 | 1 |
| 70 | — | 143 | 13 | 1 |
| 80 | — | 250 | 13 | 1 |
| 90 | — | — | 32 | 1 |
| 100 | — | — | 190 | 1 |
| 110 | — | — | — | 5 |

TABLE 16

10 Min. Gels - Heat Aged (150° F.)

| Bentonite (lb/bbl) | Base | KCl | Choline Chloride | (I) |
|---|---|---|---|---|
| 10 | 0 | 2 | 1 | 0 |
| 20 | 4 | 0 | 0 | 0 |
| 30 | 30 | 0 | 1 | 2 |
| 40 | 184 | 2 | 2 | 0 |
| 50 | — | 26 | 3 | 0 |
| 60 | — | 63 | 6 | 1 |
| 70 | — | 300 | 10 | 1 |
| 80 | — | — | 14 | 0 |
| 90 | — | — | 32 | 1 |
| 100 | — | — | 134 | 2 |
| 110 | — | — | — | 20 |

TABLE 17

Yield Point Heat Aged (150°)

| Bentonite (lb/bbl) | Base | KCl | Choline Chloride | (I) |
|---|---|---|---|---|
| 10 | 0 | 2 | 1 | 0 |
| 20 | 8 | 1 | 0 | 1 |
| 30 | 62 | 0 | 3 | 3 |
| 40 | — | 2 | 3 | 0 |
| 50 | — | 9 | 5 | 0 |
| 60 | — | 45 | 10 | 1 |
| 70 | — | 136 | 18 | 1 |
| 80 | — | — | 28 | 0 |
| 90 | — | — | 69 | 1 |
| 100 | — | — | — | — |
| 110 | — | — | — | — |

*If 600 RPM reading is greater than 300, no further readings were taken.

Based on the above results one of skill in the art should conclude that the shale hydration inhibitors of this invention have superior performance characteristics when compared to conventional shale hydration inhibitors.

EXAMPLE 5

Dispersion tests were run with Foss Elkland cuttings and bentonite chunks by hot rolling 20 gm cuttings in one-barrel equivalent of fluid for 16 hours at 150° F. After hot rolling the remaining cuttings were screened using a 20 mesh screen and washed with tap water and weighed to obtain the percentage recovered. The results of this evaluation are given in the tables 18 and 19 shows the superior shale inhibition performance of shale inhibition agent I of this invention.

TABLE 18

Shale Dispersion Test
Foss Elkland Cuttings (4.6–8.0 mm.)

|  | Total Recovered |
|---|---|
| Base Fluid (350 cc H$_2$ + 1 gm PHP) | 68.0 |
| Base + 8 ppb Choline Chloride | 71.8 |
| Base + 8 ppb (I) | 82.7 |

TABLE 19

Shale Dispersion Test
Bentonite Cuttings

| | Total Recovered |
|---|---|
| Base Fluid | 85.8 |
| Base + 8 ppb Choline Chloride | 89.8 |
| Base + 8 ppb (I) | 92.6 |

EXAMPLE 6

The following experiment was conducted to demonstrate the superior performance of product (I) of this invention in a field mud, when compared to choline chloride (a shale inhibitor disclosed in U.S. Pat. No. 5,908,814) and to hexamethyldiamine product (a shale inhibitor disclosed in U.S. Pat. No. 5,771,971). The field mud was a lignite-water based mud, 13.68 pounds per gallon weighed with barite from Clayton Williams Inc., Robertson County, Texas.

TABLE 20

Field Mud - 600 rpm Rheologies
Heat Aged (150° F.)

| Bentonite (lb/bbl) | Base Mud | (I) | Choline Chloride | Hexamethyl diamine chloride salt |
|---|---|---|---|---|
| — | 54 | 58 | 129 | 217 |
| 10 | 116 | 62 | 86 | 300* |
| 20 | 300* | 64 | 114 | — |
| 30 | — | 98 | 149 | — |
| 40 | — | 170 | 178 | — |

*If 600 RPM reading is greater than 300, no further readings were taken.

TABLE 21

Field Mud - 300 rpm Rheologies
Heat Aged(150° F.)

| Bentonite (lb/bbl) | Base Mud | (I) | Choline Chloride | Hexamthyl diamine chloride salt |
|---|---|---|---|---|
| — | 29 | 31 | 100 | 172 |
| 10 | 68 | 35 | 52 | — |
| 20 | 238 | 41 | 82 | — |
| 30 | — | 58 | 110 | — |
| 40 | — | 96 | 130 | — |

TABLE 22

Field Mud - 3 rpm Rheologies
Heat Aged (150° F.)

| Bentonite (lb/bbl) | Base Mud | (I) | Choline Chloride | Hexamethyl diamine chloride salt |
|---|---|---|---|---|
| — | 3 | 2 | 41 | 170 |
| 10 | 5 | 2 | 8 | — |
| 20 | 25 | 3 | 37 | — |
| 30 | — | 4 | 59 | — |
| 40 | — | 6 | 70 | — |

TABLE 23

Field Mud - 10 Min Gels
Heat Aged (150° F.)

| Bentonite (lb/bbl) | Base Mud | (I) | Choline Chloride | Hexamethyl diamine chloride salt |
|---|---|---|---|---|
| — | 8 | 13 | 44 | 135 |
| 10 | 26 | 15 | 33 | — |
| 20 | 76 | 20 | 30 | — |
| 30 | — | 32 | 67 | — |
| 40 | — | 77 | 86 | — |

TABLE 24

Field Mud - Plastic Viscosity
Heat Aged (150° F.)

| Bentonite (lb/bbl) | Base Mud | (I) | Choline Chloride | Hexamethyl diamine chloride salt |
|---|---|---|---|---|
| — | 25 | 4 | 71 | 127 |
| 10 | 20 | 8 | 18 | — |
| 20 | — | 8 | 50 | — |
| 30 | — | 18 | 71 | — |
| 40 | — | 22 | 82 | — |

TABLE 25

Field Mud - Yield Point
Heat Aged (150° F.)

| Bentonite (lb/bbl) | Base Mud | (I) | Choline Chloride | Hexamethyl diamine chloride salt |
|---|---|---|---|---|
| — | 4 | 4 | 71 | 127 |
| 10 | 20 | 8 | 18 | — |
| 20 | — | 8 | 50 | — |
| 30 | — | 18 | 71 | — |
| 40 | — | 22 | 82 | — |

EXAMPLE 7

The evaluation of the shale hydration inhibitor (I) neutralized with citric acid to a pH of ~7.0 has been conducted. The results in the tables, 26–28 show the superior perforrmance of the products of this invention at pH 7.0.

TABLE 26 pH Study - 10 Min Gels
Heat Aged (150° F.)

| Bentonite (lb/bbl) | pH 11.0 | pH 7.0 |
|---|---|---|
| 10 | 0 | 0 |
| 20 | 0 | 0 |
| 30 | 2 | 0 |
| 40 | 0 | 0 |
| 50 | 0 | 0 |
| 60 | 1 | 1 |
| 70 | 1 | 1 |
| 80 | 0 | 2 |
| 90 | 1 | 2 |
| 100 | 2 | 4 |
| 110 | 20 | 5 |
| 120 | — | 6 |
| 130 | — | 10 |

TABLE 26-continued pH Study - 10 Min Gels
Heat Aged (150° F.)

| Bentonite (lb/bbl) | pH 11.0 | pH 7.0 |
|---|---|---|
| 140 | — | 14 |
| 150 | — | 32 |
| 160 | — | 80 |

TABLE 27 pH Study - Plastic Viscosity
Heat Aged (150° F.)

| Bentonite (lb/bbl) | pH 11.0 | pH 7.0 |
|---|---|---|
| 10 | 2 | 1 |
| 20 | 2 | 1 |
| 30 | 4 | 1 |
| 40 | 5 | 2 |
| 50 | 9 | 3 |
| 60 | 13 | 3 |
| 70 | 18 | 4 |
| 80 | 47 | 4 |
| 90 | 94 | 5 |
| 100 | — | 5 |
| 110 | — | 7 |
| 120 | — | 8 |
| 130 | — | 10 |
| 140 | — | 13 |
| 150 | — | 26 |
| 160 | — | 47 |

TABLE 28 pH Study - Yield Point
Heat Aged Data

| Bentonite (lb/bbl) | pH 11.0 | pH 7.0 |
|---|---|---|
| 10 | 0 | 0 |
| 20 | 1 | 0 |
| 30 | 3 | 0 |
| 40 | 0 | 0 |
| 50 | 0 | 0 |
| 60 | 1 | 0 |
| 70 | 1 | 0 |
| 80 | 0 | 0 |
| 90 | — | 1 |
| 100 | — | 3 |
| 110 | — | 4 |
| 120 | — | 7 |
| 130 | — | 7 |
| 140 | — | 10 |
| 150 | — | 36 |
| 160 | — | 96 |

*If 600 RPM reading is greater than 300, no further readings were taken.

In view of the above disclosure, one having ordinary skill in the art should understand and appreciate that one illustrative embodiment of the present invention is a water-base drilling fluid for use in drilling wells through a formation containing a shale which swells in the presence of water. Such an illustrative drilling fluid includes: a weight material and a shale hydration inhibition agent having the general formula:

$$H_2N\text{---}CH(CH_3)CH_2\{\text{---}OCH_2CH(CH_3)\text{---}\}_x\text{---}NH_2$$

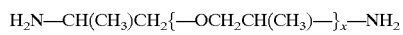

in which x is a value less than 15, and the shale hydration inhibition agent is present in sufficient concentration to reduce the swelling of the shale as illustrated in the above examples. The drilling fluid of the illustrative embodiment should have an average number for the x of between about 1 and about 5 preferably between 1 and 3 and more preferably x should have an average number of about 2.6.

Further the shale hydration inhibition agent should preferably be further characterized by a relatively low toxicity as measured by the Mysid shrimp test and compatibility with anionic drilling fluid components that may be present in the drilling fluid.

The drilling fluids of the present illustrative embodiment preferably have an aqueous based continuous phase selected from: fresh water, sea water, brine, mixtures of water and water soluble organic compounds and mixtures thereof. In addition such an illustrative drilling fluid may further contain a fluid loss control agent selected from the group of organic polymers, starches, and mixtures thereof. It is in the scope of the present invention that the drilling fluid may further contain an encapsulating agent such as one preferably selected from the group consisting of organic and inorganic polymers and mixtures thereof. In one preferred illustrative embodiment the weight material selected from the group of barite, hematite, iron oxide, calcium carbonate, magnesium carbonate, water soluble organic and inorganic salts, and combinations thereof.

Another illustrative embodiment of the present invention includes a water-base drilling fluid for use in drilling wells through a formation containing a shale clay which swells in the presence of water. Such an illustrative drilling fluid includes: an aqueous based continuous phase a weight material, and a hydration inhibition agent having the formula:

$$H_2N\text{---}CH(CH_3)CH_2\{\text{---}OCH_2CH(CH_3)\text{---}\}_x\text{---}NH_2$$

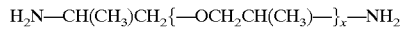

wherein x is selected such that the average molecular weight of the hydration inhibition agent is from about 132 to about 2112. The hydration inhibition agent should be present in the drilling fluid in sufficient concentrations to reduce the swelling of the clay.

The drilling fluids of the present illustrative embodiment preferably have an aqueous based continuous phase selected from: fresh water, sea water, brine, mixtures of water and water soluble organic compounds and mixtures thereof. In addition such an illustrative drilling fluid may further contain a fluid loss control agent selected from the group of organic polymers, starches, and mixtures thereof. It is in the scope of the present invention that the drilling fluid may further contain an encapsulating agent such as one preferably selected from the group consisting of organic and inorganic polymers and mixtures thereof. In one preferred illustrative embodiment the weight material is selected from the group of barite, hematite, iron oxide, calcium carbonate, magnesium carbonate, water soluble organic and inorganic salts, and combinations thereof.

The present invention also encompasses a method of reducing the swelling of shale clay in a well utilizing the fluids of the present invention. Such an illustrative method includes circulating in the well a water-base drilling fluid formulated in accordance to what is disclosed herein. It is preferred that the drilling fluid include: an aqueous based continuous phase; a weight material, and a shale hydration inhibition agent having the formula:

$$H_2N\text{---}CH(CH_3)CH_2\{\text{---}OCH_2CH(CH_3)\text{---}\}_x\text{---}NH_2$$

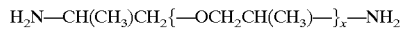

in which x is a value less than 15. The shale hydration inhibition agent should be present in sufficient concentration to reduce the swelling of clay. The drilling fluid of the illustrative embodiment should have an average number for the x of between about 1 and about 5 preferably between 1 and 3 and more preferably x should have an average number of about 2.6.

The drilling fluids of the present illustrative embodiment preferably have an aqueous based continuous phase selected from: fresh water, sea water, brine, mixtures of water and water soluble organic compounds and mixtures thereof. In addition such an illustrative drilling fluid may further contain a fluid loss control agent selected from the group of organic polymers, starches, and mixtures thereof. It is in the scope of the present invention that the drilling fluid may further contain an encapsulating agent such as one preferably selected from the group consisting of organic and inorganic polymers and mixtures thereof. In one preferred illustrative embodiment the weight material selected from the group of barite, hematite, iron oxide, calcium carbonate, magnesium carbonate, water soluble organic and inorganic salts and combinations thereof.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A water-base drilling fluid for use in drilling wells through a formation containing a shale which swells in the presence of water, the drilling fluid comprising:
    an aqueous based continuous phase;
    a weight material; and
    a shale hydration inhibition agent having the formula:

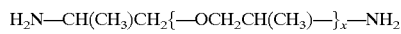

wherein x is a value less than 15, and
    wherein the shale hydration inhibition agent is present in sufficient concentration
    to reduce the swelling of the shale.

2. The drilling fluid of claim 1 wherein x has an average number between about 1 and about 5.

3. The drilling fluid of claim 1 wherein x has an average number of about 2.6.

4. The drilling fluid of claim 1 wherein the shale hydration inhibition agent being further characterized by low toxicity and compatibility with anionic drilling fluid components.

5. The drilling fluid of claim 1 wherein the aqueous based continuous phase is selected from: fresh water, sea water, brine, mixtures of water and water soluble organic compounds and mixtures thereof.

6. The drilling fluid of claim 1 wherein the drilling fluid further contains a fluid loss control agent selected from the group consisting of organic polymers, starches, and mixtures thereof.

7. The drilling fluid of claim 1 wherein the drilling fluid further contains an encapsulating agent selected from the group consisting of organic and inorganic polymers and mixtures thereof.

8. The drilling fluid of claim 1 wherein the weight material selected from the group consisting of barite, hematite, iron oxide, calcium carbonate, magnesium carbonate, magnesium organic and inorganic salts, calcium chloride, calcium bromide, magnesium chloride, zinc halides and combinations thereof.

9. A water-base drilling fluid for use in drilling wells through a formation containing a shale clay which swells in the presence of water, the drilling fluid comprising
    an aqueous based continuous phase
    a weight material, and
    a hydration inhibition agent having the formula:

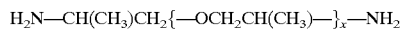

wherein x is selected such that the average molecular weight of the hydration inhibition agent is from about 132 to about 944 and
    wherein the hydration inhibition agent is present in the drilling fluid in sufficient concentrations to reduce the swelling of the clay.

10. The drilling fluid of claim 9 wherein x is selected such that the average molecular weight of the hydration inhibition agent is from about 190 to about 248.

11. The drilling fluid of claim 9 wherein the aqueous based continuous phase is selected from: fresh water, sea water, brine, mixtures of water and water soluble organic compounds and mixtures thereof.

12. The drilling fluid of claim 11 wherein the drilling fluid further contains a fluid loss control agent selected from the group consisting of organic polymers, starches, and mixtures thereof.

13. The drilling fluid of claim 12 wherein the drilling fluid further contains an encapsulating agent selected from the group consisting of organic and inorganic polymers and mixtures thereof.

14. The drilling fluid of claim 13 wherein the weight material selected from the group consisting of barite, hematite, iron oxide, calcium carbonate, magnesium carbonate, magnesium organic and inorganic salts, calcium chloride, calcium bromide, magnesium chloride, zinc halides and combinations thereof.

15. A method of reducing the swelling of shale clay encountered during the drilling of a subterranean well, the method comprising:
    circulating in the subterranean well a water-base drilling fluid including:
    an aqueous based continuous phase and
    a shale hydration inhibition agent having the formula:

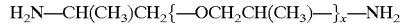

wherein x is a value less than 15, and
    wherein the shale hydration inhibition agent is present in sufficient concentration to reduce the swelling of the clay.

16. The drilling fluid of claim 15 wherein x has an average number between about 1 and about 5.

17. The drilling fluid of claim 16 wherein the shale hydration inhibition agent being further characterized by low toxicity and compatibility with anionic drilling fluid components.

18. A method of reducing the swelling of shale clay encountered during the drilling of a subterranean well, the method comprising: circulating in the subterranean well a water-base drilling fluid including:
    an aqueous based continuous phase,
    a weight material, and
    a finctionally effective concentration of the a shale hydration inhibition agent having the formula:

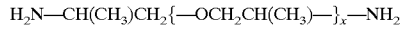

wherein x is selected such that the average molecular weight of the hydration inhibition agent is from about 132 to about 2112 and the shale hydration inhibition agent being present in a concentration sufficient to reduce the swelling of the clay.

19. The drilling fluid of claim 18 wherein x is selected such that the average molecular weight of the hydration inhibition agent is from about 190 to about 248.

* * * * *

UNITED STATES PATENT AND TRADEMARK OFFICE
CERTIFICATE OF CORRECTION

PATENT NO. : 6,247,543 B1
DATED : June 19, 2001
INVENTOR(S) : Arvind D. Patel et al.

It is certified that error appears in the above-identified patent and that said Letters Patent is hereby corrected as shown below:

Column 3,
Line 28, delete "Theological" and insert -- rheological --.

Signed and Sealed this

Fifteenth Day of January, 2002

Attest:

JAMES E. ROGAN
Attesting Officer  Director of the United States Patent and Trademark Office